United States Patent
Kuroiwa et al.

(10) Patent No.: US 7,260,710 B2
(45) Date of Patent: Aug. 21, 2007

(54) INITIALIZING FUNCTION BLOCK REGISTERS USING VALUE SUPPLYING SETTING INTERFACE COUPLED TO TABLE LINKING BLOCK IDENTIFIER TO MULTIPLE REGISTER ADDRESS SET

(75) Inventors: Koichi Kuroiwa, Kawasaki (JP); Norihiro Ikeda, Kawasaki (JP); Masami Kanasugi, Kawasaki (JP); Shoji Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 154 days.

(21) Appl. No.: 11/091,584

(22) Filed: Mar. 29, 2005

(65) Prior Publication Data

US 2005/0210230 A1    Sep. 22, 2005

(51) Int. Cl.
*G06F 9/312* (2006.01)
(52) U.S. Cl. .......................................... 712/225; 713/1
(58) Field of Classification Search ...................... None
See application file for complete search history.

(56) References Cited

U.S. PATENT DOCUMENTS 6,820,191 B2 * 11/2004 Guey et al. ................. 712/225

2003/0135528 A1 * 7/2003 Choi et al. .................. 708/319

FOREIGN PATENT DOCUMENTS

| JP | 2-5115 A1 | 1/1990 |
| JP | 9-6483 A1 | 1/1997 |
| JP | 2001-22685 A1 | 1/2001 |

OTHER PUBLICATIONS

Abstract of JP-2001-101072A published Apr. 13, 2001 in Japan.
Abstract of JP-08-153001A published Jun. 11, 1996 in Japan.

* cited by examiner

*Primary Examiner*—Kenneth S. Kim
(74) *Attorney, Agent, or Firm*—Arent Fox LLP (57) ABSTRACT

A processor (1) having an instruction memory (2) supplies addressing information and setting values to be set to registers (REGA to REGD) to a setting interface unit (3), and address values of the registers are outputted from an address output unit (5) based on the addressing information. The outputted address values and the setting values are outputted respectively to registers to set setting values, so that the processor can set the setting values to be set to the registers without being conscious of the addresses of the registers, and thus it becomes possible to reduce addressing portions of the respective registers in the instruction codes, and reduce the number of instruction codes, which facilitates coding of the instruction codes.

13 Claims, 9 Drawing Sheets

| ADDRESS F000 | 0001h |
|---|---|
| ADDRESS F001 | 0001h |
| ADDRESS F002 | F000h |
| ADDRESS F003 | FF00h |
| ADDRESS F004 | 0104h |
| ADDRESS F005 | 0008h |
| ADDRESS F006 | 0001h |
| ADDRESS F007 | 0011h |
| ADDRESS F008 | 2584h |
| ADDRESS F009 | 33CCh |
| ADDRESS F00A | 0040h |
| ADDRESS F00B | 0001h |
| ADDRESS F00C | FFFFh |
| ADDRESS F00D | FFFFh |
| ADDRESS F00E | 084Fh |
| ADDRESS F00F | 00FFh |
| ADDRESS F010 | 0001h |
| ADDRESS F011 | 4002h |
| ADDRESS F012 | A000h |
| ADDRESS F013 | 0100h |
| ADDRESS F014 | 0001h |
| ADDRESS F015 | — |
| ADDRESS F016 | — |

FIG. 3

| FUNC1 | FUNC2 | FUNC3 |
|-------|-------|-------|
| F000  | F000  | F001  |
| F008  | F008  | F002  |
| F009  | F009  | F003  |
| F01F  | F01F  | F004  |
| F02F  | F02F  | F130  |
| F100  | F100  | F131  |
| F101  | F101  | F163  |
| F102  | F102  | F165  |
| F103  | F103  | F204  |
| F10A  | F10A  | F2A0  |
| F200  | F200  | F2A1  |
| F2F0  | F2F0  | F2A2  |
| F2F1  | F2F1  | F300  |
| F2F2  | F2F2  | F301  |
| F2FA  | F2FA  | F3FF  |
| F300  | F300  |       |
| F330  | F330  |       |
| F331  | F331  |       |
| F380  | F380  |       |
| F381  | F381  |       |

F I G. 4

| | |
|---|---|
| F001h | F000h |
| F002h | F008h |
| F003h | F009h |
| F004h | F01Fh |
| F005h | F02Fh |
| F006h | F100h |
| F007h | F101h |
| F008h | F102h |
| F009h | F103h |
| F00Ah | F10Ah |
| F00Bh | F200h |
| F00Ch | F2F0h |
| F00Dh | F2F1h |
| F00Eh | F2F2h |
| F00Fh | F2FAh |
| F010h | F300h |
| F011h | F330h |
| F012h | F331h |
| F013h | F380h |
| F014h | F381h |

| FUNC1 | | | FUNC2 | | | FUNC3 | | |
|---|---|---|---|---|---|---|---|---|
| FB | ADDRESS | SETTING VALUE | FB | ADDRESS | SETTING VALUE | FB | ADDRESS | SETTING VALUE |
| A | F000 | 0001h | A | F000 | 0002h | A | F001 | 0003h |
| | F008 | F000h | | F008 | F0F0h | | F002 | F030h |
| | F009 | FF00h | | F009 | FF80h | | F003 | A102h |
| | F01F | 0104h | | F01F | F104h | | F004 | C222h |
| | F02F | 0008h | | F02F | A008h | | | |
| B | F100 | 0001h | B | F100 | 0002h | B | F130 | 0001h |
| | F101 | 0011h | | F101 | 0001h | | F131 | 0000h |
| | F102 | 2584h | | F102 | 0000h | | F163 | CC33h |
| | F103 | 33CCh | | F103 | CC33h | | F165 | AA00h |
| | F10A | 0040h | | F10A | 0D40h | | | |
| C | F200 | 0001h | C | F200 | 0002h | C | F204 | 0002h |
| | F2F0 | FFFFh | | F2F0 | 000Fh | | F2A0 | 000Fh |
| | F2F1 | FFFFh | | F2F1 | 6400h | | F2A1 | 5500h |
| | F2F2 | 084Fh | | F2F2 | 0840h | | F2A2 | 0055h |
| | F2FA | 00FFh | | F2FA | FF00h | | | |
| D | F300 | 0001h | D | F300 | 0002h | D | F300 | 8000h |
| | F330 | 4002h | | F330 | 0002h | | F301 | 0020h |
| | F331 | A000h | | F331 | 00F0h | | F3FF | FFFFh |
| | F380 | 0100h | | F380 | 0001h | | | |
| | F381 | 0001h | | F381 | FFFFh | | | |

FIG. 9

```
MOV X = F000;
MOV (X++0),0001h;
MOV X = F008;
MOV (X++0),F000h;
MOV X = F009;
MOV (X++0),FF00h;
MOV X = F01F;
MOV (X++0),0104h;
MOV X = F02F;
MOV (X++0),0008h;
MOV X = F100;
MOV (X++0),0001h;
MOV X = F101;
MOV (X++0),0011h;
MOV X = F102;
MOV (X++0),2584h;
MOV X = F103;
MOV (X++0),33CCh;
MOV X = F10A;
MOV (X++0),0040h;
MOV X = F200;
MOV (X++0),0001h;
MOV X = F2F0;
MOV (X++0),FFFFh;
MOV X = F2F1;
MOV (X++0),FFFFh;
MOV X = F2F2;
MOV (X++0),084Fh;
MOV X = F2FA;
MOV (X++0),00FFh;
MOV X = F300;
MOV (X++0),0001h;
MOV X = F330;
MOV (X++0),4002h;
MOV X = F331;
MOV (X++0),A000h;
MOV X = F380;
MOV (X++0),0100h;
MOV X = F381;
MOV (X++0),0001h;
```

INITIALIZING FUNCTION BLOCK REGISTERS USING VALUE SUPPLYING SETTING INTERFACE COUPLED TO TABLE LINKING BLOCK IDENTIFIER TO MULTIPLE REGISTER ADDRESS SET

CROSS-REFERENCE TO RELATED APPLICATIONS

This application is based upon prior International Patent Application No. PCT/JP2003/04055, filed on Mar. 31, 2003, the entire contents of which are incorporated herein by reference.

TECHNICAL FIELD

The present invention relates to a semiconductor device, especially suitable to be used for a multifunctional semiconductor integrated circuit which realizes different functions according to values set in a register.

BACKGROUND ART

Among semiconductor integrated circuits such as an LSI, there exists a multifunctional semiconductor integrated circuit (a multifunctional LSI) that realizes different functions according to a setting value (data) in a register. In recent years, improvements in the performance of the multifunctional LSI to get higher and more multiple functions have increased the amount of data that can be processed in the LSI. Also the number of registers to set up operation modes and various parameters to realize desired functions have increased. The setting of values to these registers is performed mainly by software or the firmware of a processor (for instance, a CPU or a DSP), which requires a considerable amount of time because of the increasing number of registers.

Figure 7:
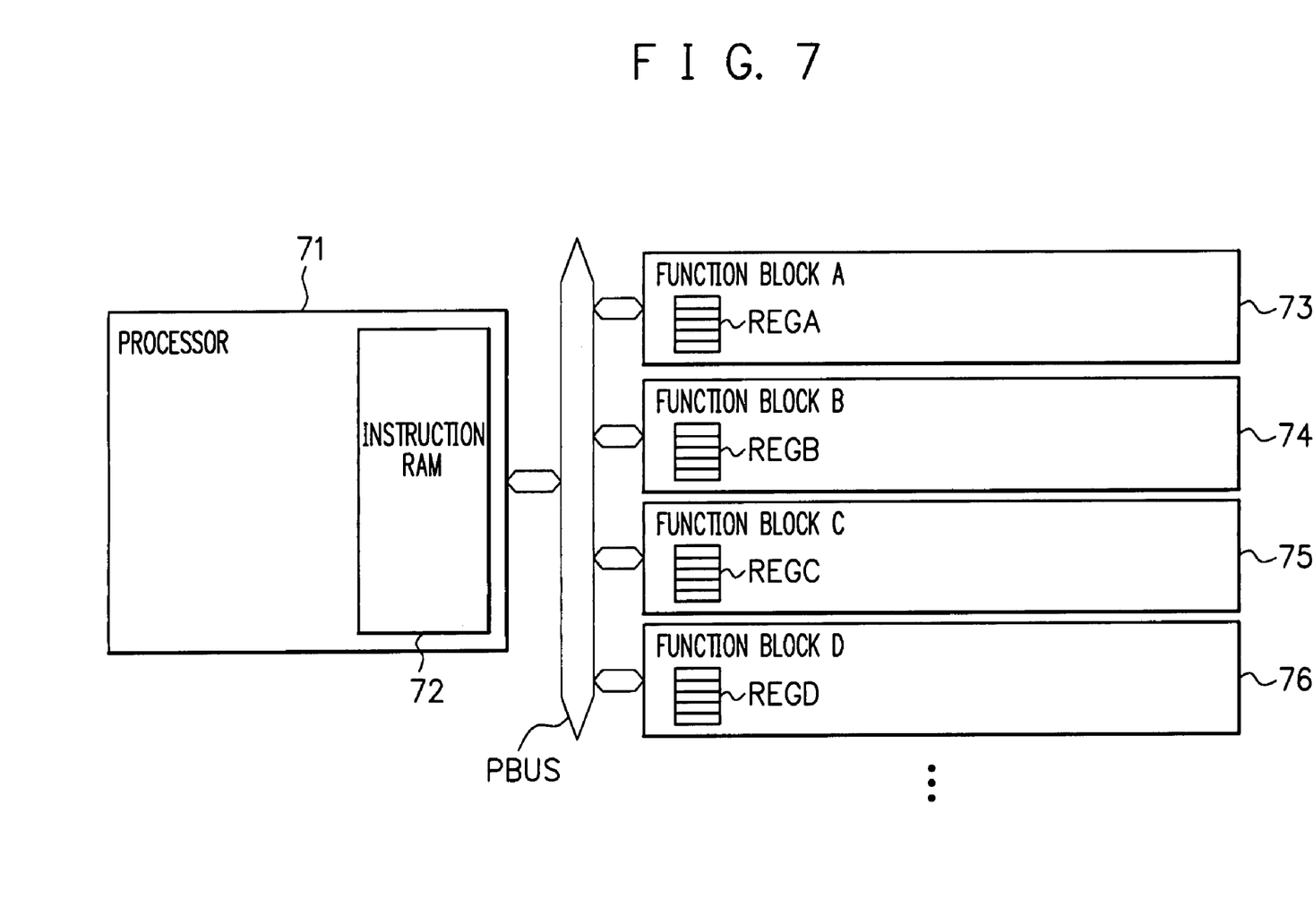
FIG. 7 is a block diagram showing a configuration example of a conventional multifunctional LSI.

FIG. 7 is a block diagram showing a configuration example of a conventional multifunctional LSI. Note that as for a functional block, only four functional blocks from 73 to 76 are shown to simplify the explanation thereof in FIG. 7.

In FIG. 7, a processor 71 is structured including an instruction RAM (Random Access Memory) 72, and performs various functions such as microprocessing, register setting processing, and miscellaneous control processing. The instruction RAM 72 serves to store instruction codes and the like for commands to be performed by the processor 71.

A function block A73 is a functional unit which is composed of hardware, and includes a plurality of registers REGA. The function block A73 realizes a predetermined function according to values set in the registers REGA. Function blocks B74 to D76 are composed in a similar manner to the function block A73, and realize predetermined functions according to values set in a plurality of registers REGB to REGD which are included in respective function blocks.

The function blocks 73 to 76 are respectively connected to a processor bus PBUS of the processor 71, and the registers REGA to REGD which are included in the function blocks 73 to 76 are mapped in an external memory space of the processor 71. In the following explanation, the registers REGA are assumed to be mapped in a region of address values from F000 to F0FF in the external memory space, and the registers REGB, REGC, and REGD are assumed to be mapped in the regions of address values from F100 to F1FF, from F200 to 21FF, and from F300 to F3FF in the external memory space respectively.

Figure 8:
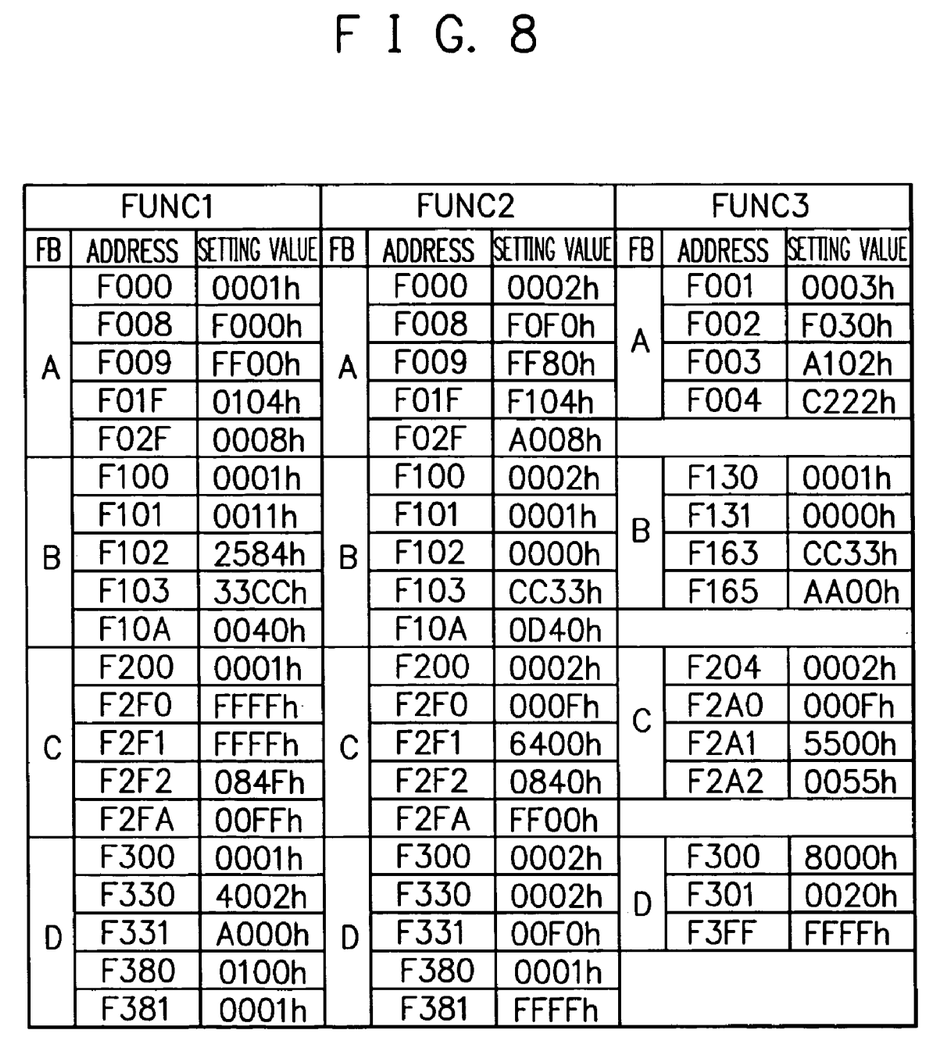
FIG. 8 is a view showing an example of setting values to set to registers.

FIG. 8 is a view showing an example of setting values to the registers from REGA to REGD in a multifunctional LSI shown in FIG. 7. It should be noted that a register from the registers REGA to REGD is supposed to be a 16-bit register.

For instance, in order to realize a first function (function 1: FUNC 1), "0001h" (h means it is expressed in a hexadecimal notation) is set to a register having an address of F000 of the function block A73, and "F000h" is set to a register having an address of F008, and so on. Similarly, "0001h" is set to an address of F100, "0011h" is set to an address of F101 of the function block B74, and so on, "0001h" is set to an address of F200, "FFFFh" is set to an address of F2F0 of the function block C75, and so on, and "0001h" is set to an address of F300, "4002h" is set to an address of F330 of the function block D76, and so on.

Also, for instance, in order to realize a second function (function 2: FUNC 2) which is different from the first function, "0002h" is set to an address of F000, "F0F0h" is set to an address of F008, and so on of the function block A73, and "0002h" is set to an address of F100, "0001h" is set to an address of F101, and so on of the function block B74, and "0002h" is set to an address of F200, "000Fh" is set to an address of F2F0, and so on of the function block C75, and "0002h" is set to an address of F300, "0002h" is set to an address of F330, and so on of the function block D76.

That is, in a multifunctional LSI as shown in FIG. 8, the number of registers to be set and their addresses differ according to the function to be realized, and even among the same registers, a setting value to be set differs according to a function. Therefore, in the instruction RAM 72 included in the processor 71, an instruction code of the processor 71 relating to register setting is written in each function as shown in FIG. 9, and the instructions to give access to registers are redundantly and repeatedly stored.

Figure 9:
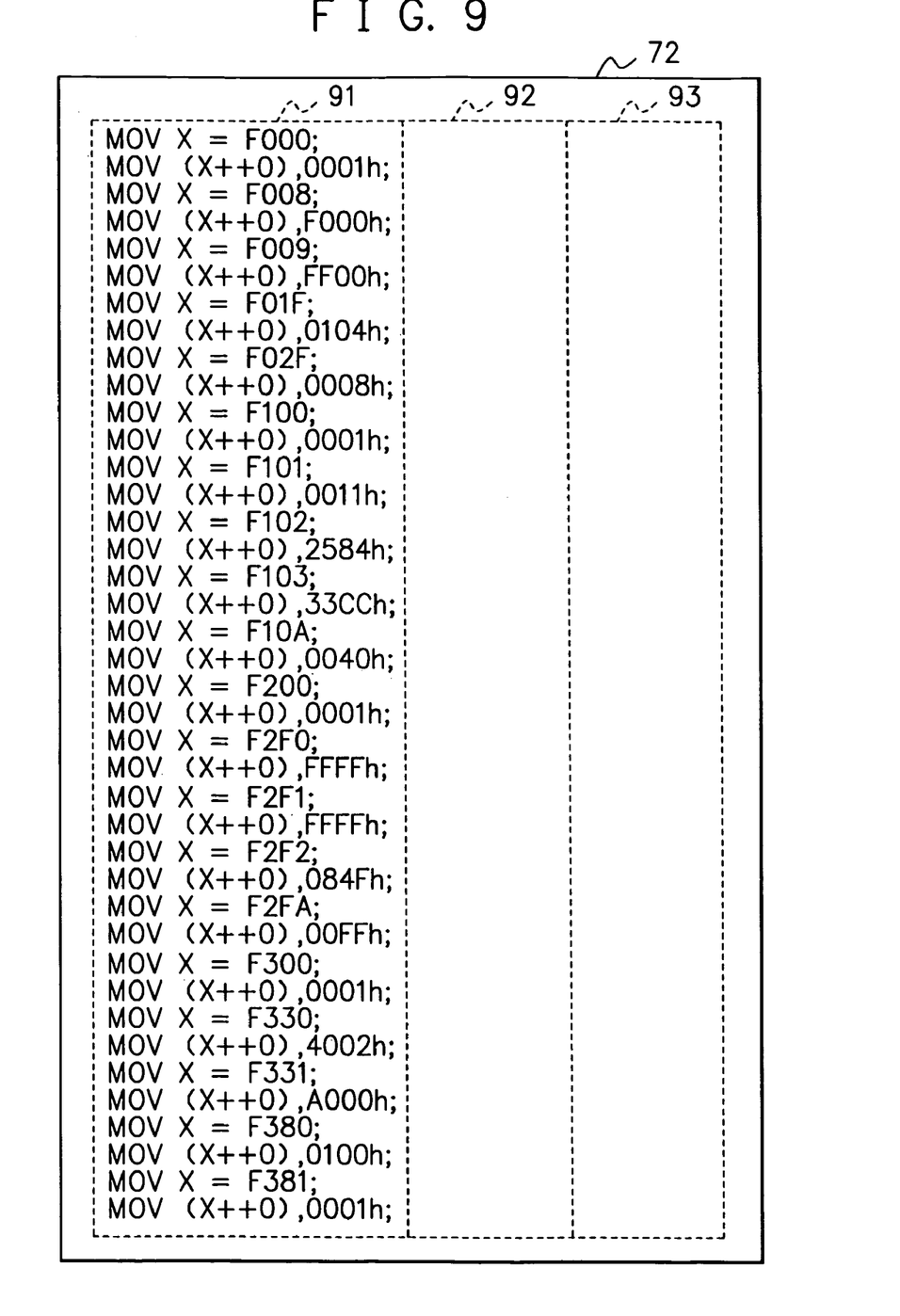
FIG. 9 is a view showing a configuration example of instruction codes relating to register setting written in the instruction RAM shown in FIG. 7.

FIG. 9 is a view showing an example of an instruction code of the processor 71 relating to register setting stored in the instruction RAM 72. An instruction code 91 serves to realize the above-described first function (function 1). An address showing a register to be set is substituted to a variable (for instance, "MOV X=F000"), and then a setting value is written into the address which is substituted into the variable (for instance, "MOV (x++0), 0001h"). That is, a value is set to a register with two commands, and this procedure is repeated for the whole registers to be set in a similar manner. Note that instruction codes 92, 93, and so on to realize a second function (function 2), a third function (function 3), and so on are also stored similarly.

However, in a multifunctional LSI having many kinds of executable functions owing to increased functionality, there is a disadvantage in that the number of instruction codes stored in the instruction RAM 72 of the processor 71 dramatically increases and demands greater storage capacity to the instruction RAM 72. Another disadvantage is that the coding of instruction codes to be stored in the instruction RAM 72 becomes very difficult.

For instance, in a multifunctional LSI used in a cellular phone, the total number of registers in all function blocks is about 2000 pieces, and the types of functions (search of initial base stations after power-on, a phone conversation, intermittent reception and so on) numbers several hundred. Accordingly, assuming that values are set only to several hundred registers for one function, instructions numbering $10^4$ or more (the number of commands is twice the number of instructions) are to be stored. Further, a change in a cellular phone system from a PDC (Personal Digital Cellular) system to a CDMA (Code Division Multiple Access) system increases the number of types of executable functions in a multifunctional LSI and increases further the number of function blocks as well as the number of registers associated with these functions.

As described above, the capacity of the instruction RAM 72 becomes large in the multifunctional LSI, and when regions occupied by the instruction RAM 72 becomes large in the processor 71, a logical portion in the processor 71 becomes small. Further, there is a disadvantage in that the ratio of register setting processing (writing into or reading from the register) occupied in processing of the processor 71 becomes large, which disturbs effective utilization of the processing capability (processing ability such as, for instance, calculation of field intensity in a case of a cellular phone) of the processor 71 in itself.

In addition, a method to prevent pressure of the instruction RAM 72 through stored instruction codes and to initialize plural registers is disclosed in a Patent Document 1.

Patent Document 1
Japanese Patent Application Laid-open No. Hei 8-153001

SUMMARY OF THE INVENTION

The present invention is achieved to solve the above-described disadvantages, and the object of the present invention is to make it possible to reduce the number of instruction codes relating to register setting, so that the storage capacity of instruction RAM included in a processor can be reduced. Another object of the present invention is to allow easy coding of instruction codes for a processor which are stored in the instruction RAM.

The present invention includes a processor having an instruction memory in which instruction to be executed is stored; a setting interface unit to which a piece of addressing information and setting values to set a plurality of registers from the processor; and an address output unit to output address values of plural registers based on the addressing information, in which the address values and the setting values are outputted from the address output unit and the setting interface unit respectively to set setting values to registers.

According to the present invention, when setting values are set to the registers, the processor can set the values to the registers without being aware of an address in the register by merely supplying addressing information and setting values to be set to the registers to the setting interface unit. Accordingly, addressing of each register by an instruction code stored in the instruction memory is not required, which makes it possible to reduce the number of instruction codes and coding of the instruction code can be easily performed.

DETAILED DESCRIPTION OF THE PREFERRED EMBODIMENTS

Hereinafter, an embodiment of the present invention will be explained based on the drawing.

Figure 1:
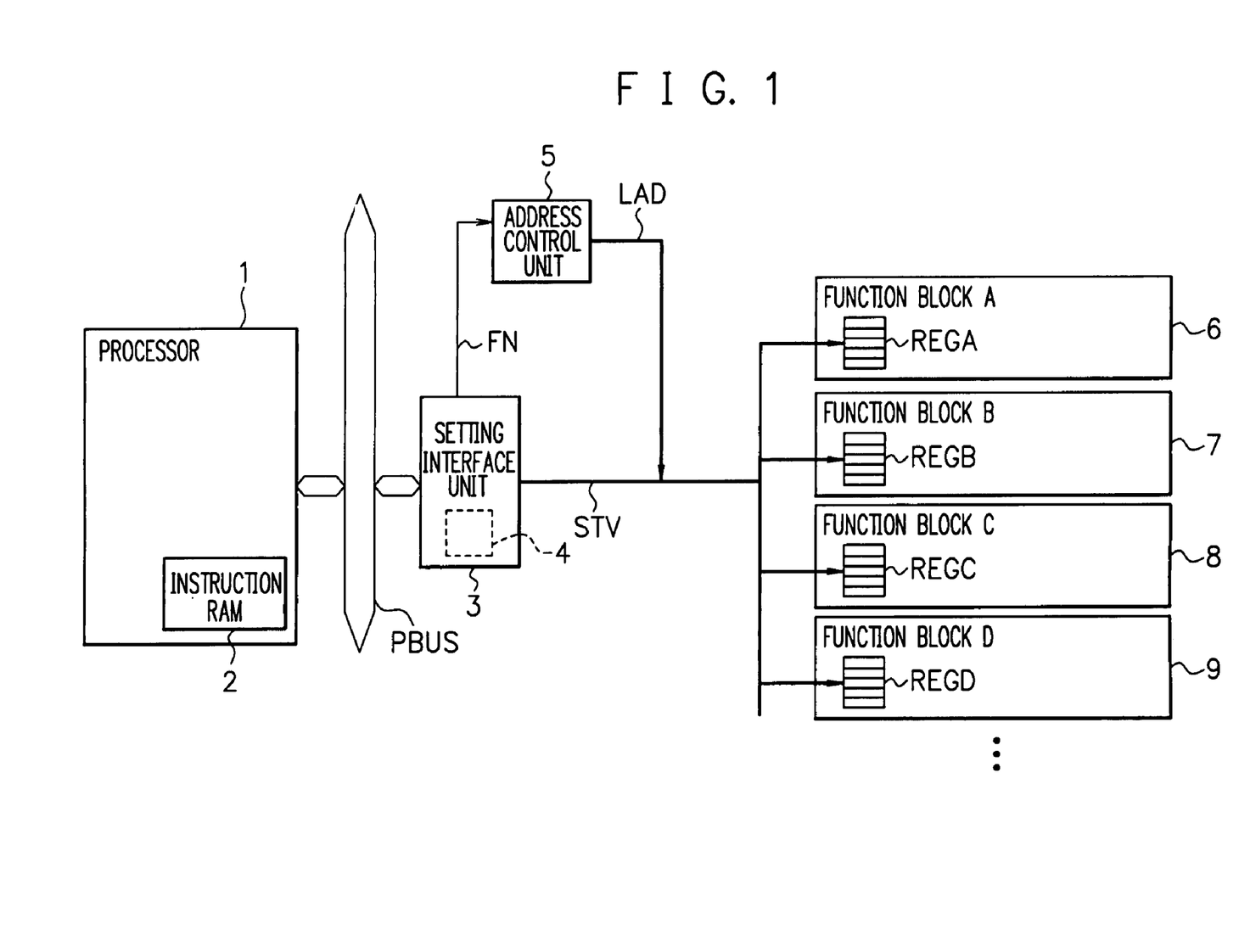
FIG. 1 is a block diagram showing a configuration example of a multifunctional semiconductor integrated circuit to which a semiconductor device according to an embodiment of the present invention is applied.

FIG. 1 is a block diagram showing a configuration example of a multifunctional semiconductor integrated circuit (multifunctional LSI) to which a semiconductor device according to an embodiment of the present invention is applied.

The multifunctional LSI in the present embodiment includes a processor 1, a setting interface unit 3, an address control unit 5, and function blocks 6 to 9. It should be noted that though only four function blocks from 6 to 9 are shown to simplify explanation in FIG. 1, the number of function blocks provided by the functional LSI in the present embodiment is arbitrary.

In the multifunctional LSI in the present embodiment, the setting interface unit 3 is mapped in an external memory space of the processor 1 and registers from REGA to REGD included in the function blocks 6 to 9 are mapped in a local address space which is different from the external memory space.

The processor 1 includes an instruction RAM 2 in which instruction codes and the like for instructions to be performed by the processor 1, and performs microprocessing, register setting processing, and various control processing, and so on according to the instruction codes.

In the setting interface unit 3, function numbers showing types of functions to be realized, and setting values to realize the above functions are written by the processor 1 into a memory unit 4 provided inside via a processor bus PBUS. The setting interface unit 3 supplies a function number FN held in the memory unit 4 to an address control unit 5, and supplies a setting value STV to the function blocks 6 to 9. Note that the memory unit 4 will be described later.

The address control unit 5 includes a ROM in which a table linking the function numbers and local addresses of the registers to be set is stored. The address control unit 5 supplies the local address LAD corresponding to the function number FN to the function block 6 to 9 based on the function number FN supplied from the setting interface unit 3. It should be noted that the processor 1 can rewrite the table at an arbitrary point of time by using a rewritable memory such as a RAM for the address control unit 5, and by connecting the rewritable memory to the processor bus PBUS and mapping it in the external memory space of the processor 1.

A function block A6 includes a plurality of registers REGA, and is a functional unit composed of hardware realizing predetermined functions according to values set to the registers REGA. Function blocks B7 to D9 are composed in a similar manner to the function block A6, and realize predetermined functions according to values set in a plurality of registers from REGB to REGD which are included in the function blocks respectively. For instance, when the multifunctional LSI in the present embodiment is used in a cellular phone, the function blocks 6 to 9 realize a modulation function, a demodulation function, an error-correction function, a channel coding (decoding) function and so on respectively.

It should be noted that in the following explanation, it is assumed that registers REGA, REGB, REGC, and REGD are mapped in regions having address values from F000 to F0FF, from F100 to F1FF, from F200 to 21FF, and from F300 to F3FF on the local address space respectively. It is also assumed that a register of the registers from REGA to REGD is a 16-bit register.

Figure 2:
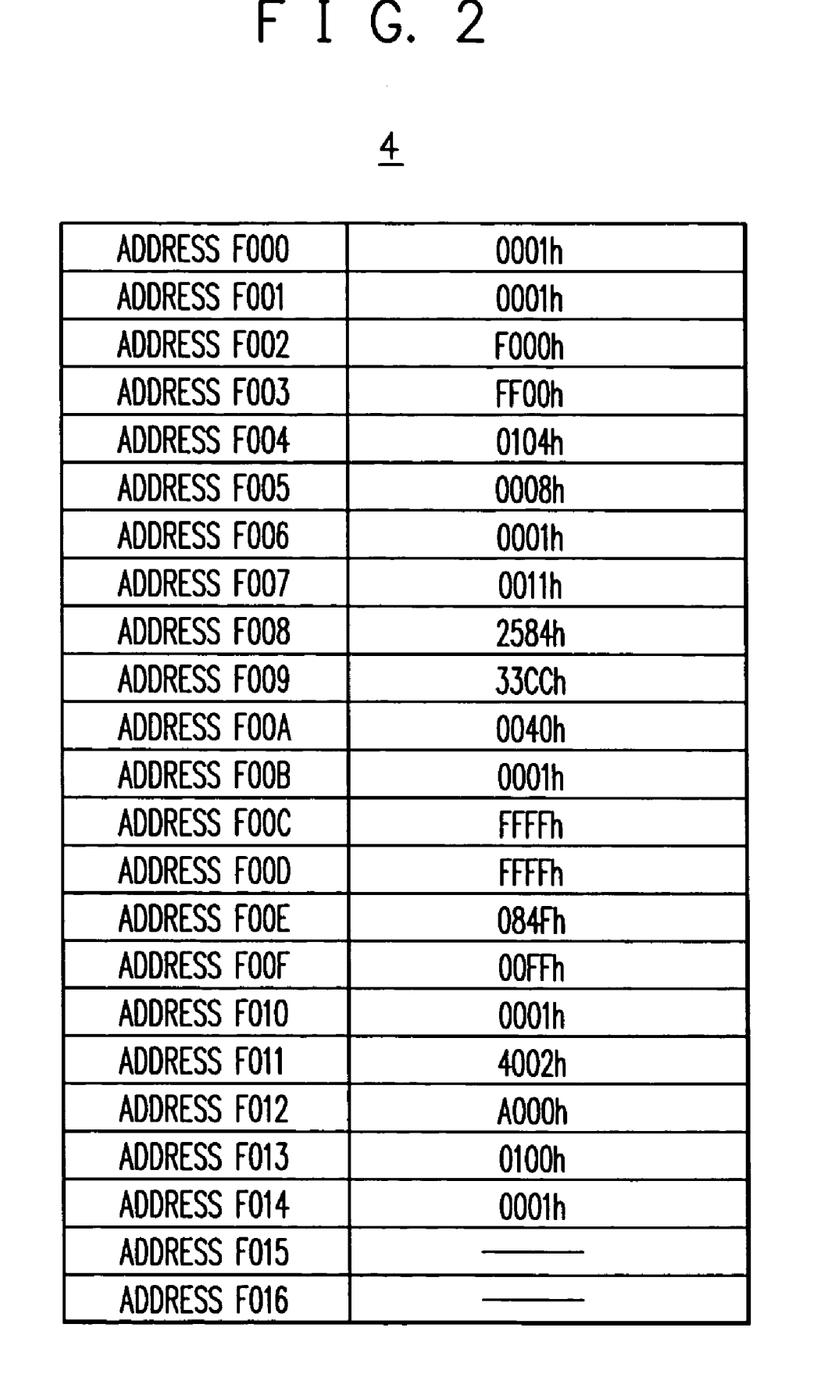
FIG. 2 is a view showing a configuration example of a memory unit provided to a setting interface unit.

FIG. 2 is a view showing a configuration example of the memory unit 4 which is provided in the setting interface unit 3. The memory unit 4 is provided to fit to the one having the maximum number of registers to set setting values among the functions to realize with the multifunctional LSI of the present embodiment. In FIG. 2, a memory unit 4 which is mapped in regions having address values from F000 to F016 in the external memory space in the processor 1 is shown as an example. That is, the example shows a case in which the number of registers to set a setting value is 22 pieces at the maximum to realize a certain function in a multifunctional LSI.

As shown in FIG. 2, a function number is written in a region having the top address of F000 in the memory unit 4, and setting values to be set to a register to realize a function are written in a region having addresses from F001 to F016. When setting values are written in the region having the addresses from F001 to F016, only the setting values are written in succession by ascending or descending numeric order of a local address of a register where the setting values exist. As described above, a function number written in the region having the address of F000 is supplied to the address control unit 5, and the setting values written in the addresses from F001 to F014 are supplied to the function blocks 6 to 9.

For instance, as shown in FIG. 2, when setting values of the first function (function 1: FUNC 1) shown in FIG. 8 are written, "0001h" is written in a region having an address of F000, and "0001h", "F000h", . . . , "0100h", "0001h" are written in the following addresses from F0001 to F014 in order. Writing is not performed in regions having addresses of F015 and F016 where no setting value to be written exists (or arbitrary values are written and thus written values are neglected in following operations).

In the explanation described above, though function numbers are to be written in a region having the address of F000, the present invention is not limited to this, an arbitrary region (address) in which a function number is written can be determined in advance, and the value written in the region can be supplied to the address control unit 5 as a function number FN.

Further, though the setting values are to be written in succession to regions having address numbers from F000 to F016 in ascending or descending numeric order of the local address of the register, if conformity between the writing order of the setting values and the writing order of the local addresses in a table described later is maintained, the setting values can be written in succession in an arbitrary order regardless of local addresses in a register.

Figure 3:
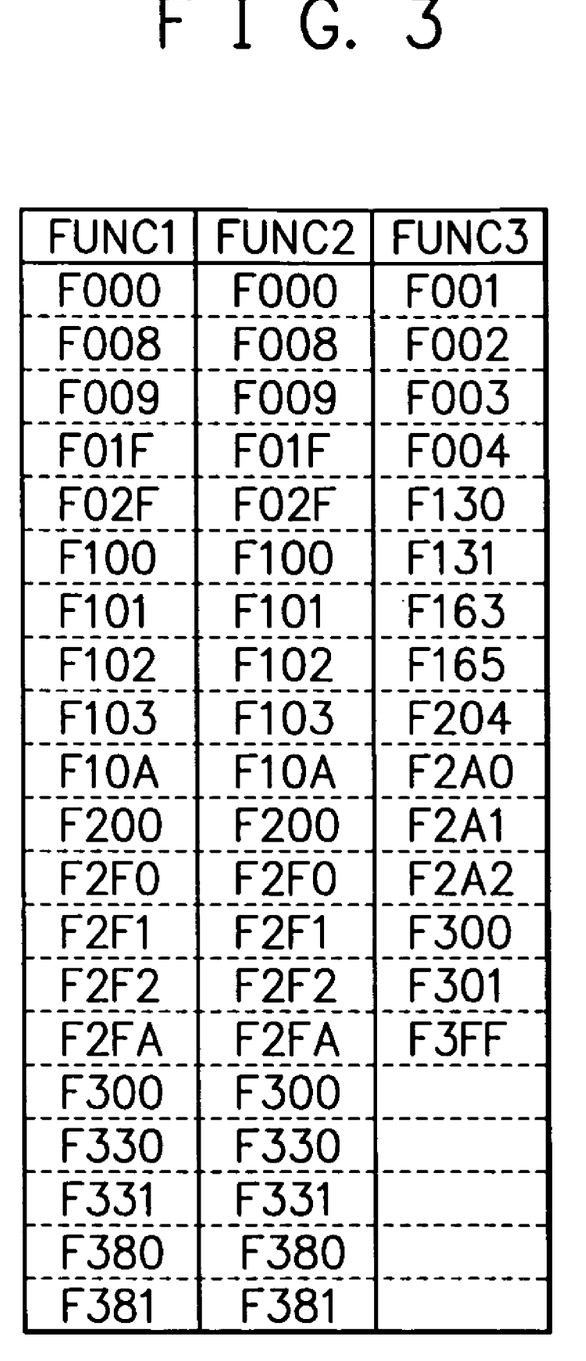
FIG. 3 is a view showing an example of a table included in the address control unit.

FIG. 3 is a view showing an example of a table included in the address control unit 5. FIG. 3 shows a table of functions from 1 to 3 (FUNCs from 1 to 3), one example of which is shown in FIG. 8.

As shown in FIG. 3, a local address in a register for which a setting value is to be set corresponding to the function number, is shown for every function number, through which a local address LAD is outputted based on the function number FN. For instance, as for function 1 (FUNC 1), F000, F008, F009, . . . , F380, F381 are shown as local addresses of the register to be set, and when "0001h" is supplied as the function number FN, the address control unit 5 supplies F000, F008, F009, . . . , F380, F381 in turn as the local addresses to the function blocks 6 to 9.

In the multifunctional LSI thus configured, when a function number and setting values to be set to registers from REGA to REGD are supplied to the setting interface unit 3 from the processor 1, the function number and setting values are written in turn into the memory unit 4 in the setting interface unit 3. The register setting processing associated with the processor 1 is completed with the above-described processing. Then, the function number FN written in the memory unit 4 is supplied from the setting interface unit 3 to the address control unit 5, and the local addresses LAD are outputted in accordance with the function number FN from the address control unit 5.

Thus, the local addresses outputted from the address control unit 5, and the setting values outputted from the setting interface unit 3 in accordance with the local addresses, are supplied to the function blocks 6 to 9 with a predetermined writing timing, so that setting values are set to the registers from REGA to REGD of the function blocks 6 to 9.

Figure 4:
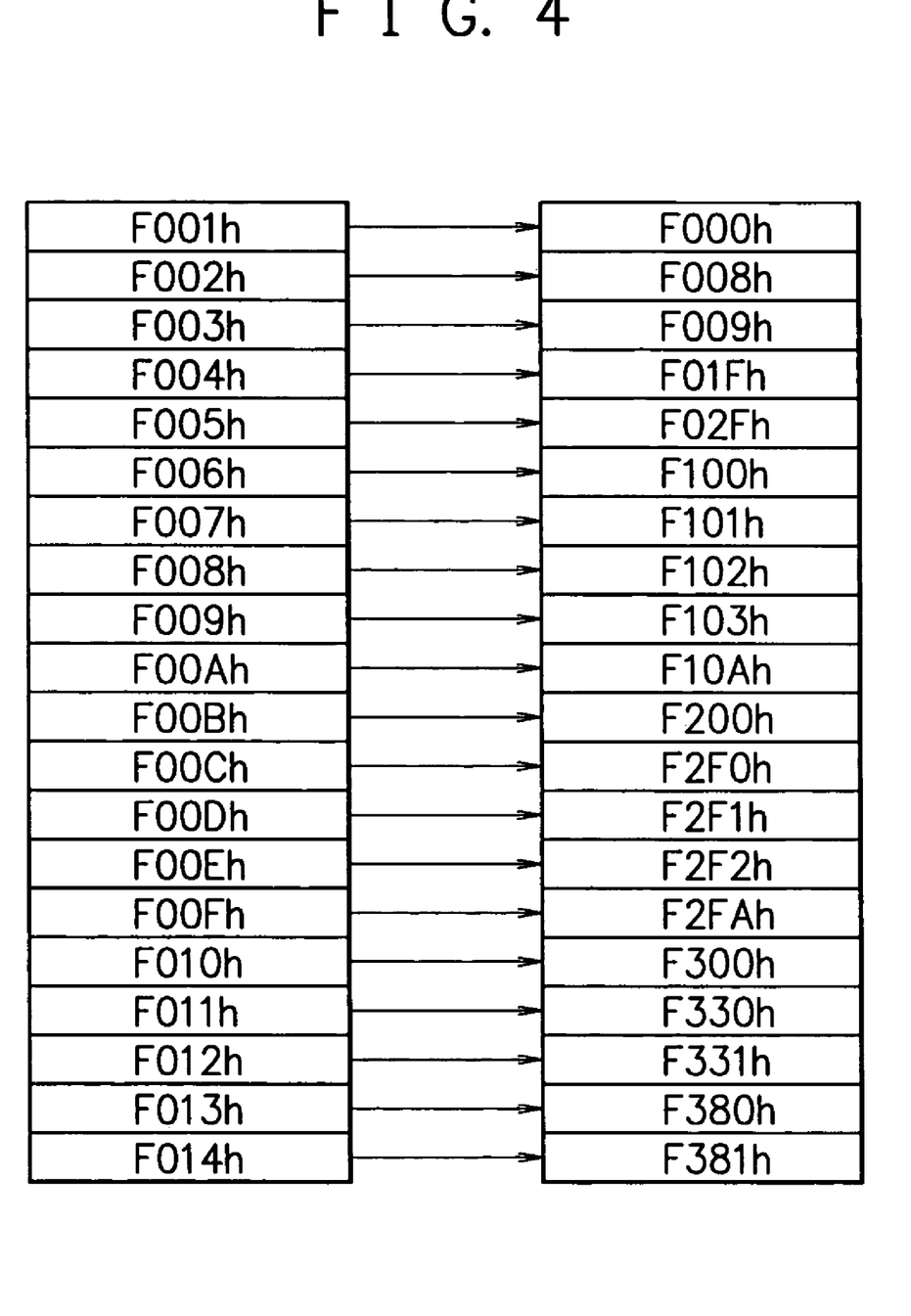
FIG. 4 is a view to explain a conversion example of a function number vs. a local address in the present embodiment.

For instance, in a case of the function 1 (the function number FN is "0001h"), an address is outputted as shown in FIG. 4. A setting value written in a region having an address of F001 in the setting interface unit 3 is written in a register having an address of F000 in a local address. Similarly, setting values written in regions having addresses of F002, F003, . . . , F014, in the setting interface unit 3 are written in the registers having addresses of F008, F009, . . . , F381 in a local address respectively.

At this time, the address control unit 5 outputs a writing pulse and the like for instance, and controls writing operation of setting values into the registers from REGA to REGD of the function blocks 6 to 9.

Figure 5:
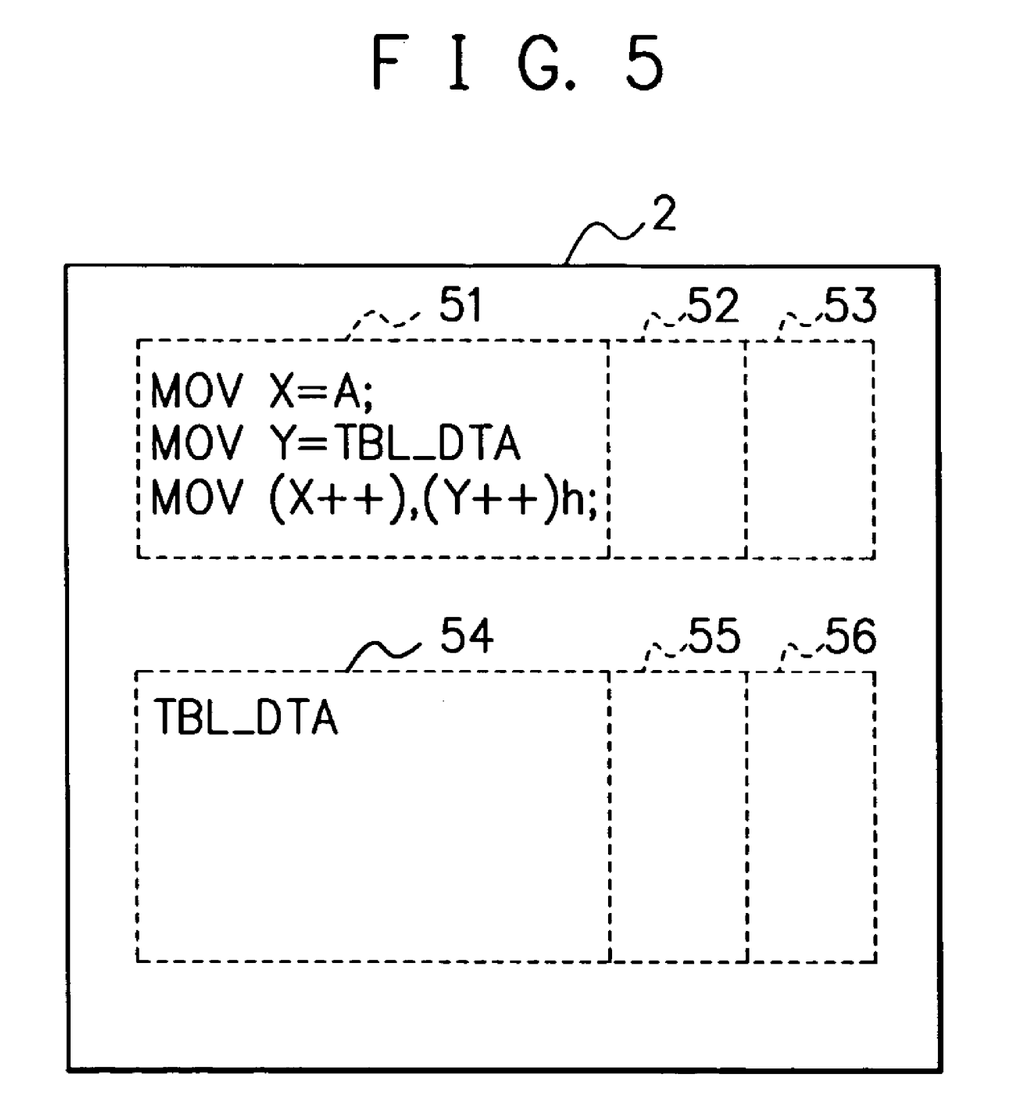
FIG. 5 is a view showing a configuration of an instruction RAM in the present embodiment.

By taking the above-described configuration, coding of an instruction code of the processor 1 shown in FIG. 5 becomes possible in the present embodiment. FIG. 5 is a view showing an example of instruction codes and the like relating to register setting processing stored in the instruction RAM 2 in the present embodiment. In FIG. 5, an instruction code 51 is an instruction code to realize the above-described first function (function 1: FUNC 1).

First, a leading address (F000) of the memory unit 4 in the setting interface unit 3 is substituted into a variable X (MOV X=A), then data in a data table (TBL_DTA) 54 in the instruction RAM 2 in which only setting values are arranged is obtained and is substituted into a variable Y (MOV Y=TBL_DTA). Then, the value substituted into the variable Y is written into the address substituted into variable X in the setting interface unit 3. That is, a setting value is written into the setting interface unit 3 (MOV (X++), (Y++)h).

By successively incrementing the variable X (address) through a LOOP form or the like, setting values to be set finally can be set to the registers from REGA to REGD. Accordingly, the conventional processor processes relating to an address value and a setting value alternatively in such a manner that an address value is related to a setting value which is related to another address value which is related to another setting value in turn and so on, but in the present embodiment, an addressing portion of a register for an instruction code is eliminated, and the processor only processes almost relating to setting values in such a manner that a function number to a setting value to another setting value and so on. That is, the present embodiment makes it possible to set setting values to be set to the registers REGA to REGD with nearly half the amount of processing by the processor.

It should be noted that as for a second function (function 2: FUNC 2) and a third function (function 3: FUNC 1) by storing instruction codes 52 and 53, and data tables 55 and 56 into respective instruction RAM 2, setting values to be set can be set to the registers from REGA to REGD. Note that since data in the data tables 54, 55, 56 can be renewed based on a result of microprocessing in the processor 1, the data tables 54, 55, and 56 are provided in the instruction RAM 2.

As explained in detail above, according to the present embodiment, when setting values in response to functions to be realized are set into the registers from REGA to REGD, the processor 1 can set setting values to the registers from REGA to REGD by just supplying function numbers and the setting values to the setting interface unit 3 without being conscious of numerous addresses of registers from REGA to REGD to where the setting values are set.

Accordingly, the necessity to include addressing portion in an instruction code relating to register setting to store in the instruction RAM 2 disappears, and as is understood by comparing an instruction code according to the present embodiment shown in FIG. 5 and a conventional instruction code shown in FIG. 9, it becomes possible to reduce the number of instruction codes so as to reduce storage capacity to be provided by the instruction RAM 2, which facilitates coding of the instruction code. Besides, when a portion of a setting value is modified, since address values and setting values are mixedly existed previously, it may cause a mistake in the modification. However, in the present embodiment, since only setting values are shown, it becomes possible to reduce the probability of mistake in modification.

The register setting processing performed by the processor 1 is only to supply function numbers and setting values to be set to the registers from REGA to REGD to the setting interface unit 3, it becomes possible to reduce the processing time required for the register setting processing by the processor 1 compared with the time required conventionally. Accordingly, the original processing capacity of the processor 1 can be effectively used, or cost can be reduced by using a processor 1 having a lower processing capability (MIPS value).

A concrete example of applying a multifunctional LSI according to the present embodiment described above to a cellular phone, will be explained below.

Figure 6:
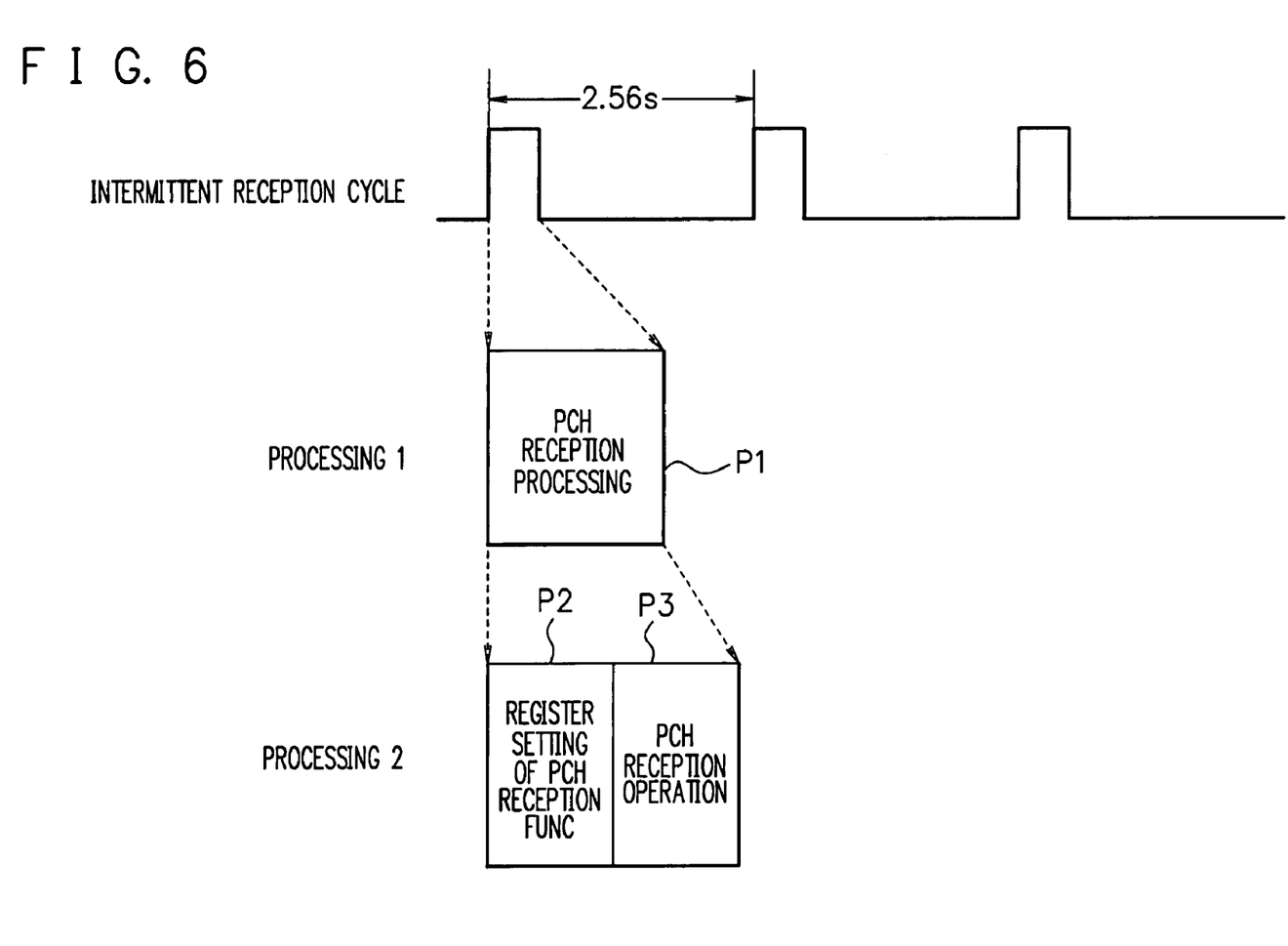
FIG. 6 is a view to explain the operation of an intermittent reception processing of a cellular phone to which the present embodiment is applied.

FIG. 6 is a view explaining the operation of an intermittent reception processing of a cellular phone to which the multifunctional LSI in the present embodiment is applied. The term "intermittent reception processing" corresponds to "a processing P1" (processing 1) to monitor a paging channel (hereinafter referred to as "PCH") at predetermined time intervals (2.56 seconds shown by an intermittent reception cycle in an example shown in FIG. 6), and to confirm (call-in confirmation) whether there is a telephone call or not.

As a result of the confirmation, if there is no telephone call, it transits to a power down state (operating state in low power consumption) in which only intermittent control block is allowed to operate and power supply of other function blocks is suspended, and in the case of having a telephone call, steps to start a phone conversation are carried out. The intermittent control block includes a register and a timer and operates with low frequency clock signals.

Setting values to set to registers from REGA to REGD which are necessary to receive the above PCH are defined as one of its function, and when performing an intermittent reception processing, the processor 1 supplies a function number for the PCH reception and the setting values to set to the registers from REGA to REGD to the setting interface unit 3. Then, the setting values to receive the PCH are set to the registers from REGA to REGD (processing P2), and it transits (processing 2) to receiving operation of the PCH (processing P3).

Since the multifunctional LSI blocks power supply to the instruction RAM 2 in the processor 1 in a power down state, boot operation is required during the intermittent reception processing, power is supplied to the instruction RAM 2 in either of the above-described intermittent reception processing or the power down state. Accordingly, if the capacity of the instruction RAM 2 is as large as previously, a large amount of power is consumed by leakage current, which is a big disadvantage for a battery operated device, such as a cellular phone. However, according to the present embodiment, since the storage capacity required of the instruction RAM 2 can be largely reduced as described above, the volume of the instruction RAM can be substantially reduced so that consumption of power due to leakage current in the instruction RAM 2 can also be substantially reduced.

Note that as for other examples of functions when the multifunctional LSI according to the present embodiment is applied to a cellular phone, initial base station search, a telephone call and so on after power on can be cited.

It should be noted that in the above-described embodiment, though a function number is shown as an example to show types of functions to be realized, it is not limited to this, arbitrary information to show the types of the functions may be used. Besides, it is not limited to those showing the types of the functions, any arbitrary information to allow it to output address values of a plurality of registers can be accepted.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

INDUSTRIAL APPLICABILITY

As described above, according to the present invention, one of addressing information and setting values to set to a plurality of registers are supplied from a processor having an instruction memory to a setting interface unit, and address values of a plurality of registers are outputted from an address output unit based on the addressing information, so that the outputted address values and setting values are outputted to resister respectively to set setting values.

Through this procedure, since the processor can set setting values just by supplying addressing information and setting values to be set to the registers, without being conscious of addresses of the registers, it is possible to reduce the addressing portion by an instruction codes so that the number of the instruction codes can be reduced, which leads to reduction of storage capacity of the instruction memory included in the processor. Besides, since the instruction becomes very simple compared with the conventional ways, coding of the instruction codes can be easily performed.

What is claimed is:

1. A semiconductor device comprising:
    a processor having an instruction memory in which an instruction to be executed is stored and connected to a first bus;
    a setting interface unit connected to said first bus, and supplied with a group of one piece of addressing information and setting values to be set to registers from said processor; and
    an address output unit including a table linking said addressing information with address values of registers in which each of setting values in accordance with the addressing information is set respectively, and outputting address values of said registers to set the setting values in accordance with addressing information supplied from said setting interface unit, in reference with the table;
    wherein said setting values outputted from said setting interface unit are set to said registers, using said address values outputted from said address output unit.

2. The semiconductor device according to claim 1, wherein said table is stored in a read only memory.

3. The semiconductor device according to claim 1, wherein said table is stored in a rewritable memory connected to said first bus.

4. The semiconductor device according to claim 1, wherein said setting interface unit includes a memory unit to store said addressing information and setting values to be set to said registers.

5. The semiconductor device according to claim 4, wherein said memory unit has storage capacity in accordance with the maximum number of setting values to be set to registers which can be supplied from said processor.

6. The semiconductor device according to claim 4, wherein setting values to be set to said plural registers supplied from said processor are written in continuous regions of said memory unit.

7. A semiconductor device including a function unit capable of realizing different functions according to setting values to be set to registers, said semiconductor device comprising:
    a processor having an instruction memory in which an instruction to be executed is stored, and connected to a first bus;
    a setting interface unit, connected to said first bus, and supplied with a group of one piece of function information showing a realizable function and setting values to be set to registers to realize the function, from said processor; and
    an address output unit including a table linking said function information with address values of registers in which each of setting values in accordance with the function information is set respectively, and outputting address values of said plural registers to set the setting values in accordance with said function information supplied from said setting interface unit, in reference with the table,
    wherein said setting values to be outputted by said setting interface unit are set to said registers using said address values outputted by said address output unit.

8. The semiconductor device according to claim 7, wherein said setting interface unit includes a memory unit to store said function information and setting values to be set to said registers,
    wherein said memory unit has storage capacity in accordance with the maximum number of setting values to be set to registers which can be supplied from said processor.

9. The semiconductor device according to claim 7, further comprising:
    a plurality of said functional units including an intermittent control functional unit to allow other functional units to execute an intermittent processing at fixed intervals,
    wherein the power supply to other functional units different from the intermittent control function unit is suspended according to the execution result of said intermittent processing.

10. The semiconductor device according to claim 9, wherein the intermittent processing comprises an intermittent reception processing to perform call-in confirmation.

11. A semiconductor device comprising:
    a processor having an instruction memory in which instructions to be executed are stored;
    a plurality of registers disposed in a local address space different from an address space of said processor;
    a setting interface unit disposed in the address space of said processor, and supplied with a group of one piece of addressing information and setting values to be set to said registers from said processor; and
    an address output unit including a table linking said addressing information with local address values of registers in which each of setting values in accordance with the addressing information is set respectively, and outputting local address values of said registers to set said setting values in accordance with addressing information supplied from said setting interface unit, in reference with said table,
    wherein said setting values outputted from said setting interface unit are set to said registers using said local address values outputted from said address output unit.

12. The semiconductor device according to claim 11, wherein said setting interface unit includes a memory unit to store said addressing information and setting values to be set to said registers,
    wherein said memory unit has storage capacity in accordance with the maximum number of setting values to be set to registers which can be supplied from said processor.

13. The semiconductor device according to claim 11, wherein said register is a register provided in a functional unit to realize different functions according to setting values.

* * * * *

UNITED STATES PATENT AND TRADEMARK OFFICE
CERTIFICATE OF CORRECTION

PATENT NO. : 7,260,710 B2
APPLICATION NO. : 11/091584
DATED : August 21, 2007
INVENTOR(S) : Kuroiwa et al.

It is certified that error appears in the above-identified patent and that said Letters Patent is hereby corrected as shown below:

On the title page, under item (63) insert the following:

--Related U.S. Application Data (63) Continuation of application No. PCT/JP03/04055, filed March 31, 2003.--

Signed and Sealed this

Third Day of March, 2009

JOHN DOLL
*Acting Director of the United States Patent and Trademark Office*